(12) United States Patent
Otsuka

(10) Patent No.: US 6,901,511 B1
(45) Date of Patent: May 31, 2005

(54) PORTABLE TERMINALS, SERVERS, SYSTEMS, AND THEIR PROGRAM RECORDING MEDIUMS

(75) Inventor: Motoi Otsuka, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 762 days.

(21) Appl. No.: 09/652,499

(22) Filed: Aug. 31, 2000

(30) Foreign Application Priority Data

| Jan. 13, 2000 | (JP) | 2000-004271 |
| Jan. 13, 2000 | (JP) | 2000-004272 |
| Jan. 13, 2000 | (JP) | 2000-004273 |

(51) Int. Cl.$^7$ .................................................. H04L 9/00
(52) U.S. Cl. ............... 713/164; 713/166; 713/155; 713/193; 713/200; 364/900; 364/200; 705/1; 705/26; 705/42; 380/22; 380/4; 380/8; 380/9; 380/23; 380/24; 380/25
(58) Field of Search ............... 705/1, 26, 42; 380/22–25, 4, 8–9; 235/382, 375; 364/900, 200; 178/22.09, 22, 22.08; 713/200, 155, 193, 164, 166

(56) References Cited

U.S. PATENT DOCUMENTS

| 4,375,579 | A | | 3/1983 | Davida et al. |
| 4,430,728 | A | * | 2/1984 | Beitel et al. ............. 379/93.02 |
| 4,688,169 | A | | 8/1987 | Joshi |
| 5,448,045 | A | * | 9/1995 | Clark ........................ 235/382 |
| 6,016,476 | A | * | 1/2000 | Maes et al. .................... 705/1 |
| 6,044,349 | A | * | 3/2000 | Tolopka et al. ............... 705/1 |
| 6,131,090 | A | * | 10/2000 | Basso et al. ................ 706/23 |
| 6,154,879 | A | * | 11/2000 | Pare et al. .................... 705/35 |

FOREIGN PATENT DOCUMENTS

EP      0 378 385 A2      7/1990

* cited by examiner

*Primary Examiner*—Charles Rones
*Assistant Examiner*—Belix M. Ortiz
(74) *Attorney, Agent, or Firm*—Frishauf, Holtz, Goodman & Chick, P.C.

(57) ABSTRACT

Data containing important information are stored in DB cards separable from terminals. The terminals and mediums are placed in corresponding relationship. Multi-security measures are taken to prevent a third party not authorized to access one of the DB cards from accessing the card and its data due to loss and robbery of the DB card and the third party's malice to thereby prevent the information from leaking out from the DB card. To this end, when the terminal accesses the DB card, the terminal compares its own hardware identification number with that of the card to determine whether the terminal is authorized to access the DB card. When it is, the terminal 2 further compares its own software identification number with that of the card to determine whether the terminal is further authorized to access a mobile DB in the card.

4 Claims, 17 Drawing Sheets

FIG.4

| SETTING TABLE | | GROUP SALES 1 | GROUP SALES 2 | GROUP SALES 3 |
|---|---|---|---|---|
| GROUP NAME | | | | |
| HARDWARE ID NO. | | | | |
| SET NUMBER OF TERMINALS | | | | |
| | TERMINAL NAME 1 | | | |
| | TERMINAL NAME 2 | | | |
| | TERMINAL NAME 3 | | | |
| THE NUMBERS OF USERS | | | | |
| VIEWER DISABLING INPUT COUNT N | | | | |
| USER NAME 1 | | | | |
| | PASSWORD | | | |
| USER NAME 2 | | | | |
| | PASSWORD | | | |
| USER NAME 3 | | | | |
| | PASSWORD | | | |
| USER NAME 4 | | | | |
| | PASSWORD | | | |
| SCRAMBLE KEY SK | | | | |
| RECORD CIPHERING KEY RK | | | | |
| MOBILE DB NAME 1 | | | | |
| | MASTER DB NAME | | | |
| | RECORD EXTRACT CONDITIONS | | | |
| | FIELDS TO BE EXTRACTED | | | |
| MOBILE DB NAME 2 | | | | |
| | MASTER DB NAME | | | |
| | RECORD EXTRACT CONDITIONS | | | |
| | FIELDS TO BE EXTRACTED | | | |
| CUSTOMIZE APPLICATION 1 | | | | |
| | SOFTWARE ID NO. (COMMON) | | | |
| | UPDATE DATA | | | |
| | CORR. MOBILE DB NAME | | | |
| CUSTOMIZE APPLICATION 2 | | | | |
| | SOFTWARE ID NO. (COMMON) | | | |
| | UPDATE DATA | | | |
| | CORR. MOBILE DB NAME | | | |
| BASIC SOFTWARE | | | | |
| | RETRIEVAL VIEWER | | | |
| | FAT SCRAMBLE / DESCRAMBLE ALGORITHM | | | |
| | CIPHER / DECIPHER ALGORITHM | | | |
| | OPERATION CONTROL / MANAGE FILE | | | |

Table block marked ~11

MASTER DB FILES ~12

BASIC APPLICATIONS CORR. TO MASTER DBS ~13

FIG.5

CARD'S INTERNAL COMPOSITION

| |
|---|
| HARDWARE ID NO. (FIXED) |
| FAT (SCRAMBLED) |
| BASIC SOFTWARE |
|     RETRIEVAL VIEWER |
|     FAT SCRAMBLE / DESCRAMBLE ALGORITHM |
|     CIPHER / DECIPHER ALGORITHM |
|     OPERATION CONTROL / MANAGE FILE |
| VIEWER DISABLING INPUT COUNT N |
| USER NAME 1 |
|     CIPHERED PASSWORD + TIME VARIABLE KEY |
| USER NAME 2 |
|     CIPHERED PASSWORD + TIME VARIABLE KEY |
| USER NAME 3 |
|     CIPHERED PASSWORD + TIME VARIABLE KEY |
| USER NAME 4 |
|     CIPHERED PASSWORD + TIME VARIABLE KEY |
| RECORD CIPHERING KEY RK |
| MOBILE DB NAME 1 |
|     DB (CIPHERED) |
| MOBILE DB NAME 1 |
|     DB (CIPHERED) |
| CUSTOMIZE APPLICATION 1 |
|     SOFTWARE ID NO. (COMMON) |
|     UPDATE DATE |
|     CORR. MOBILE DB NAME |
| CUSTOMIZE APPLICATION 2 |
|     SOFTWARE ID NO. (COMMON) |
|     UPDATE DATE |
|     CORR. MOBILE DB NAME |

FIG.6

BUILT-IN MEMORY COMPOSITION

| FLASH ROM | |
|---|---|
| | HARDWARE ID NO. |
| | SOFTWARE ID NO. |
| | SCRAMBLE KEY SK |
| RAM (TEMPORARY MEMORY) | |
| | KEY / DATA INPUT AREA |
| | FAT READ AREA |
| | RECORD AREA |
| | OTHERS |

FIG.10A

MASTER DB

| | NAME | ADDRESS | PHONE NO. | MAIL ADDRESS | JOB | COMPANY NAME | AGE | UPDATE DATE |
|---|---|---|---|---|---|---|---|---|
| 1 | AKAO | | | | | | | 10/01/ '99 |
| 2 | AOKI | | | | | | | 10/15/ '99 |
| 3 | SATO | | | | | | | 10/30/ '99 |
| 4 | SOSI | | | | | | | 11/25/ '99 |
| 5 | YODA | | | | | | | 12/20/ '99 |
| 6 | TAKI | | | | | | | 01/15/ '00 |
| 7 | NAKATA | | | | | | | 01/28/ '00 |
| 8 | IRIE | | | | | | | 02/10/ '00 |
| 9 | ABE | | | | | | | 02/20/ '00 |
| 10 | NAGATA | | | | | | | 03/10/ '00 |

FIG.10B

EXTRACTED RECORDS

| | NAME | ADDRESS | PHONE NO. | MAIL ADDRESS | JOB | COMPANY NAME | AGE | UPDATE DATE |
|---|---|---|---|---|---|---|---|---|
| 1 | TAKI | | | | | | | 01/15/ '00 |
| 2 | NAKATA | | | | | | | 01/28/ '00 |
| 3 | IRIE | | | | | | | 02/10/ '00 |
| 4 | ABE | | | | | | | 02/20/ '00 |
| 5 | NAGATA | | | | | | | 03/10/ '00 |

FIG.10C

CHANGED RECORD COMPOSITION

| | NAME | ADDRESS | JOB | AGE |
|---|---|---|---|---|
| 1 | TAKI | | | |
| 2 | NAKATA | | | |
| 3 | IRIE | | | |
| 4 | ABE | | | |
| 5 | NAGATA | | | |

COMPLETED MOBILE DB

PORTABLE TERMINALS, SERVERS, SYSTEMS, AND THEIR PROGRAM RECORDING MEDIUMS

BACKGROUND OF THE INVENTION

1. Field of the Invention

The present invention relates to security managing schemes for devising a countermeasure to meet access of an unjust portable terminal to a portable data-recording medium.

2. Background Art

Recently, portable recording mediums such as compact disks and memory cards have increasing capacities and decreasing sizes such that databases of a large capacity may be contained therein for carrying purposes.

Many salesmen carry their respective portable terminals to perform their daily sales activities. The portable terminals each have a built-in memory whose capacity is small, so that a part or all of a database used for transacting works thereof is stored in a portable storage medium. The salesmen set the storage mediums in their terminals, carry the terminals to their customers/clients, and there access data stored in the storage mediums to display, output and/or update the data. In order to ensure access of a rightful terminal to the storage medium, an input password is used to verify whether the terminal user is rightful.

Staff members, dispatched employees, part-timers and working students of a company have increasing chances to use their dedicated portable terminals. Since they carry their portable terminals to their customers/clients for use, the portable storage mediums/terminals themselves may be lost or stolen. Thus, there is a high probability that if the portable storage medium or built-in memory of the terminal contains highly secret important personal or enterprise information, the information will be disclosed to others due to pickup, robbery of the terminals and/or malice by a third party. In the past, since the portable terminals are mainly used in others' offices/companies, the environment of operating the portable terminals such as simplification and rapidness of operation of the terminals are considered as being more important than strict security management which brings about a complex input operation at the terminals. Countermeasures to meet leakage of the information due to loss/robbery of portable storage mediums and terminals and dispatched employees' and part-timers' malice are not satisfactory. If they know a user's password, or the password is incidentally hit, any particular one of them concerned can easily access data in the user's portable terminal/its recording medium with his or her personal computer and important information contained possibly in the terminal/recording medium may be disclosed to the particular person with high probability.

If portable terminals themselves have a user-settable mechanism for taking security measures, a third person can easily change its settings and hence the mechanism itself may impair the security.

SUMMARY OF THE INVENTION

It is therefore an object of the present invention to reliably prevent important information stored in a data storage medium from being disclosed to others due to loss, robbery and/or malice and to realize complete security management which impairs no operability and requires no user's operation for security management. It is another object of the present invention to reliably prevent a third party other than a rightful terminal and operator from unjustly accessing portable storage mediums and their terminals to thereby realize reliable security management allowing for use of the storage mediums/terminals in the clients'/customers' offices/companies.

In order to achieve the above object, according to the present invention, there is provided a portable terminal which prestores first and second identification information to limit the use of a particular portable data storage medium, which prestores third and fourth identification information, comprising:

first determining means for comparing the third identification information stored in the data storage medium with the first identification information stored in the terminal and for determining based on a result of the comparison whether access to the data storage medium is allowed; and second determining means, responsive to the first determining means determining that the access to the data storage medium is allowed, for reading the fourth identification information prestored in the data storage medium, comparing this read information with the second identification information prestored in the terminal, and for determining based on a result of the last-mentioned comparison whether access to data in the data storage medium in allowed.

According to this invention, all possible multi-security measures are taken in which data including important information is stored in a portable data storage medium separable from the portable terminal, and in which the respective terminals and storage mediums are placed in corresponding relationship to prevent unjust access to the data and its storage medium due to loss, robbery and/or malice to thereby reliably prevent the important information in the data storage medium from being disclosed to the third party without requiring the rightful user to perform any special operation and without impairing the operability.

Even when the portable data storage medium which prestores data including important information is lost or stolen, all possible security measures are taken which include checking in a multiple manner to see whether the accessing terminal or user is a rightful one authorized to access the data storage medium to thereby reliably prevent unjust access to the storage medium by the third party other than the rightful one—reliable security management is realized, allowing for a situation to use the storage medium in the client'/customer' office/company.

In addition to writing a data file on the portable data storage medium, a server is capable of collectively placing data storage mediums and portable terminals authorized to access the data storage mediums in corresponding relationship, and the data storage mediums and users who are authorized to use the data storage mediums in corresponding relationship. In order to ensure security management of the data storage mediums, the portable terminals each have no mechanism for the security management. The user is not required to perform any special operations for the security management, and reliable security management is achieved which will not impair the operability of the user's terminal.

When the server writes a data file on the portable data storage medium, it ciphers data of the file efficiently in a multiple manner. Thus, even if an unjust terminal other than the rightful one can reach access to the data file of the medium, using an incidentally picked-up or stolen storage medium in a worst case, there is no danger that the whole of the file will be deciphered, and hence possible important information stored in the file is reliably prevented from leaking out.

By ciphering respective records of a data file of the storage medium beforehand, an authorized terminal is able to access the storage medium as it is ciphered. Thus, even if an unjust terminal reaches access to the data file due to pickup/robbery of the storage medium and/or malice, only security of deciphered records would be a problem, and there is no danger that the whole file will be deciphered to thereby prevent reliably leakage of important information stored in the medium.

In order to ensure security management of the portable data storage medium, in addition to writing a data file on the data storage medium, the server collectively places data storage mediums and portable terminals authorized to access the data storage mediums in corresponding relationship. The server creates a mobile data file of records cut away from a master database and writes the mobile data file on the portable data storage medium without writing the original master database on the storage medium to thereby avoid providing even the rightful terminal for the storage medium with excess information, and reliably prevent leakage of important information stored in the data storage medium to the third party due to loss/robbery and malice.

BRIEF DESCRIPTION OF THE DRAWINGS

FIG. 4 illustrates a composition of a setting table provided in the server, master DB files and basic applications corresponding to master DBs;

FIG. 5 illustrates the contents of data written in a DB card;

FIG. 6 illustrates a composition of a built-in memory of each portable terminal;

FIGS. 10A, B and C illustrate a master DB, records extracted from the master DB in accordance with record extract conditions, and records to which the respective extracted records are changed in accordance with "fields to be extracted";

FIG. 11 is a flowchart of a first security layer DB card security operation of a terminal started when its power supply is turned on;

DETAILED DESCRIPTION OF THE PREFERRED EMBODIMENT

Figure 1:
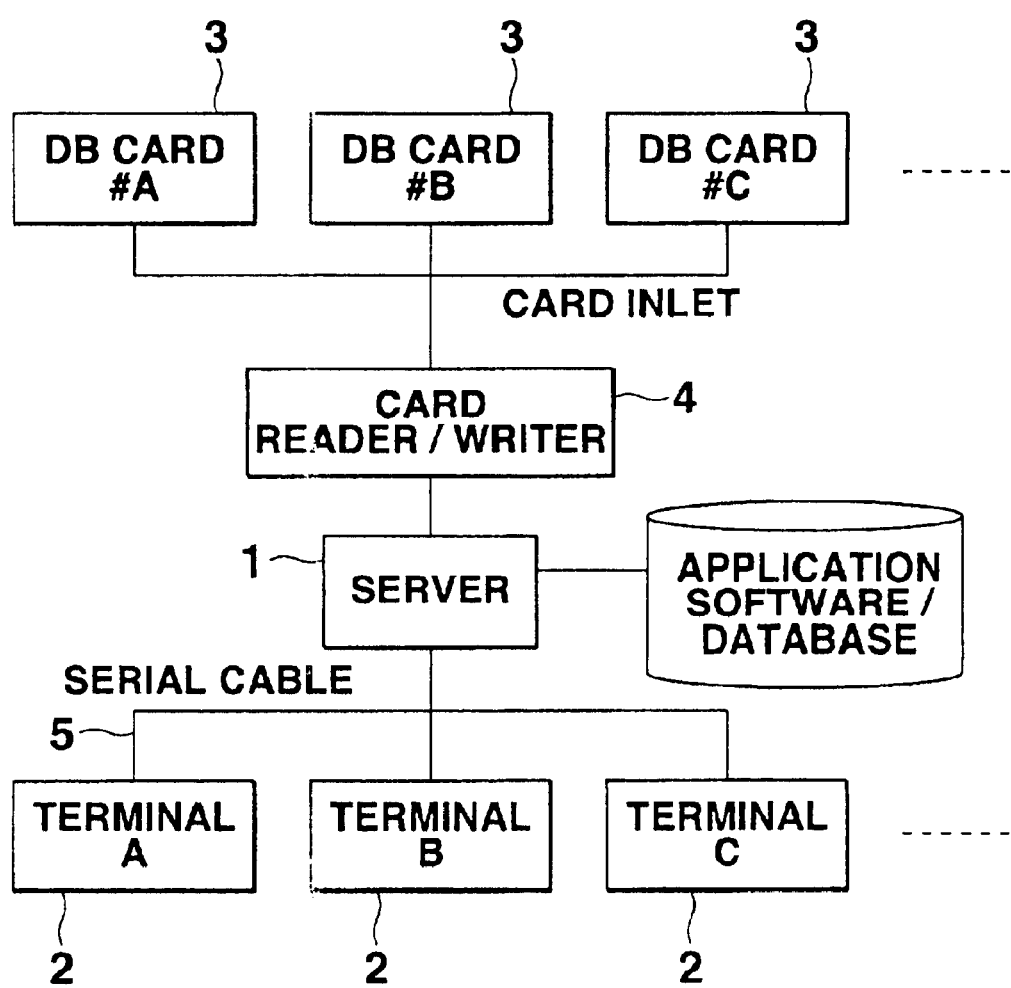
FIG. 1 is a block diagram of a security managing system according to the present invention.

A security managing system as one preferred embodiment of the present invention will be described next with reference to FIG. 1-14 of the accompanying drawings. Referring to FIG. 1, the security managing system comprises a server 1 installed, for example, in a company, a plurality of groups of mobile or portable client terminals 2 carried by the respective salesmen and connected disconnectably by serial cables 5 to the server 1, and a corresponding plurality of groups of portable storage mediums 3 set in the respective portable terminals 2 for use.

The server 1 provides each of the groups of terminals 2 through a respective one of the groups of storage mediums 3 with application software/a database stored and managed by the server 1. When the server 1 writes a database and other on the respective storage mediums 3 of each group and distributes the storage mediums to the terminals of the group, the server 1 sets information for placing the terminals and storage mediums of the group in corresponding relationship and/or takes various security measures to thereby prevent a third party from illegally copying the application software/database in one of the storage mediums 3 and also prevent the information from leaking out.

The respective salesmen access the application software/database in their storage mediums 3 at their clients'/customers' companies/offices, return to their companies/offices after the end of their sales activities, remove the storage mediums from the terminals and sets them in a card reader/writer 4 of the server 1. In response, the server 1 collects business records in the storage mediums 3 through the card reader/writer 4.

The storage mediums 3 each prestore various business transaction application programs and a database and include a compact flash card, which is hereinafter referred to as a mobile database card (DB card). Symbols "#A", "#B", "#C", . . . indicate groups of the respective DB cards 3 and correspond to groups A, B, C, . . . of the portable terminals 2. The card reader/writer 4 has a plurality of card setting slots for receiving a corresponding plurality of DB cards 3.

The server 1 distributes an application program/database (DB) file to the terminals 2 through the corresponding DB cards 3. In more detail, the server 1 calls data or an application program/DB file to be written on the DB cards 3, delivers them to the card reader/writer 4, and writes the application program/DB file to the one or more DB cards 3 set in the card reader/writer 4.

Figure 2:
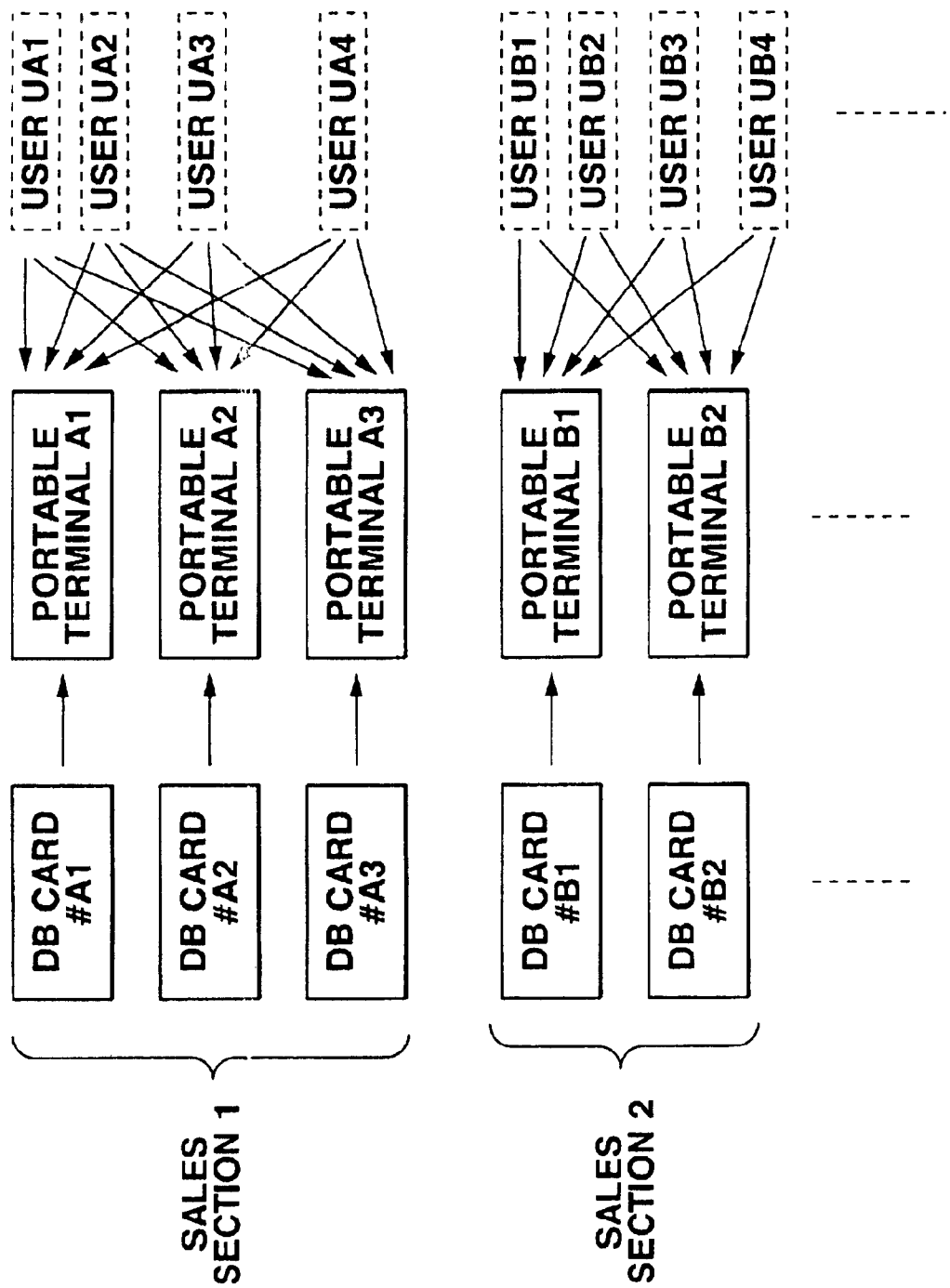
FIG. 2 illustrates the relationship between DB cards, portable terminals, and users in each of business groups.

FIG. 2 illustrates business groups "sales section 1", "sales section 2", . . . In FIG. 2, for example, the sales section 1 has DB cards #A1, #A2 and #A3, and corresponding portable terminals A1, A2 and A3 usable by any one of users UA1, UA2 and UA3. This applies to the sales section 2. To this end, a common password usable in common by any one of the group users is set on each DB card.

Figure 3:
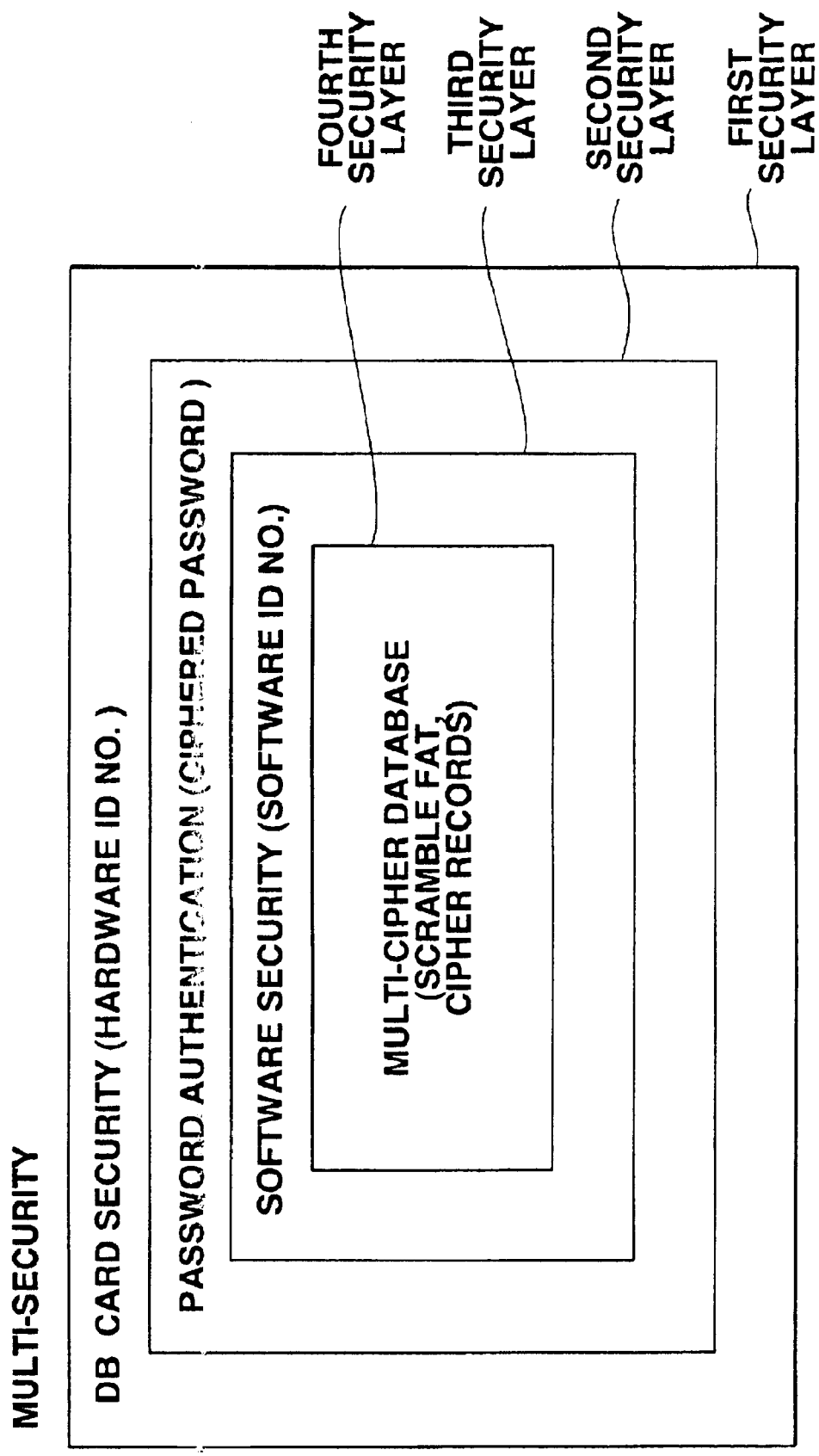
FIG. 3 schematically illustrates a multi-security scheme.

FIG. 3 schematically illustrates a multi-security managing scheme executed when any particular portable terminal 2 accesses any particular DB card. The security managing scheme is comprised of a DB card security function, a password authentication function, a software security function, and a database multi-ciphering function, performed by first, second, third and fourth security layers, respectively. The DB card security function performed in the first security layer is started up by a basic software program stored in the DB card when the terminal's power supply is turned on to compare first identification data (hardware identification numbers) stored in the terminal 2 and the DB card to determine whether the terminal 2 is allowed to access the DB card.

When the server 1 sets beforehand on a table data to be written on the terminal 2 and DB cards 3, the "hardware identification number" is produced based on unique terminal identification data (manufacturer's serial number) read from any particular one of the terminals 2 of the same group or section. The server 1 writes the same hardware identification number on all the terminals 2 and DB cards 3 of the same group or section to use the hardware identification number as common access limiting data.

When the particular terminal is allowed to access the DB card of interest as a result of the checking operation by the DB card security function, the password authentication performed by the second security layer includes a checking operation to see based on the input user authentication data (password) whether the accessing terminal or user is a rightful one. In this case, a ciphered password is used which is obtained by ciphering in a predetermined manner the password input by the terminal, and written as authentication data unique to the user on the respective corresponding DB cards 3. When there are a plurality of users who are authorized to use the terminal, all the respective users' ciphered passwords are written on the DB card. In the password authentication process performed by the second security layer, when it is determined that a wrong user password was ineffectively input repeatedly and successively a predetermined number of times N, which is hereinafter referred to as a viewer disabling input count, a retrieval viewer (an initial picture) which urges the user to input his or her password is then disabled so that no more password inputs are accepted to thereby ensure the security protection.

The software security operation performed by the third security layer includes comparing respective second or software identification data stored in the accessing terminal and the target card and determining whether the terminal should be authorized to access the database (mobile DB) in the card based on a result of the comparison. When the server 1 beforehand sets on a table data to be written on the portable terminal 2 and DB card 3, the "software identification number" is produced based on terminal identification data (manufacturer's serial number) unique to one of the terminals 2 of the same group or section and read from that terminal, the name of the group, and the name of a master DB provided in the group. The server 1 writes the software identification number on the respective terminals 2 and corresponding DB cards 3 of the same group.

The multi-ciphering operation of the database performed by the fourth security layer includes preventing the third party who has picked up/stolen a DB card from deciphering the database in the DB card even if the third party successfully accesses the DB card by breaking through the first-third security layers.

When the server 1 writes a database on the respective DB cards 3 and distributes them to the respective terminals concerned, the server 1 does not write on the respective cards the master database produced for the section, but cuts away necessary data in accordance with the contents of the work of the sales section from the master database, and creates a mobile database (DB) of the cut-away data for the group or section. In that case, the server 1 scrambles file management information of the created mobile DB, or a FAT (File Allocation Table) indicative of the respective storage positions of the files. The scrambling of the FAT is performed in any fashion with any ciphering or scrambling key. When the server 1 writes a mobile DB on a DB card 3, it ciphers the records in the mobile DB one at a time with any produced record ciphering key. As just described above, the mobile DB is multi-ciphered and written on the DB card.

FIG. 4 shows a setting table 11, master DB files 12, and basic application programs 13 corresponding to the master DBs, provided in the server 1. The setting table 11 is a one on which the server 1 beforehand sets various data to be written on the DB cards 3 and portable terminals 2. In the present embodiment, the server 1 collectively writes the required data on the DB cards 3 without causing the respective terminals 2 to write the data on the DB cards.

The setting table 11 has various set areas for each of the groups "sales section 1", "sales section 2", and "sales section 3". The data set in the set areas are written on the respective terminals 2 and DB cards 3 of the group concerned.

Set for each of the groups are a "group name", "hardware identification number", "the number of terminals" belonging to the same group, "terminal names 1, 2, 3, . . . ", "the total number of users" who are authorized to use the respective terminals.

A "viewer disabling input count N" is set for each group and represents the set number of times which a wrong password is ineffectively input successively and repeatedly to thereby disable the retrieval viewer thereafter, as described above.

"User's name 1", "password"; "user's name 2"; "password"; . . . for the respective users authorized to use the terminals are set; a "scramble key SK", and a "record ciphering key R" are set for each group.

For the respective mobile DBs to be written on the DB cards, a "mobile DB name 1", "master DB name", "record extract conditions", "fields to be extracted"; "mobile DB name 2" . . . are set. The "master DB name" specifies one of a plurality of master DB files 12 stored and managed by the server 1, and required in accordance with the contents of a business performed by the appropriate group. The "record extract conditions" and "fields to be extracted" represent conditions to create a mobile DB corresponding to the appropriate group by changing the master DB in accordance with the contents of the business of the appropriate group. More specifically, the "record extract conditions" represent conditions to extract desired records from the master DB. The "fields to be extracted" represent field extract conditions to change the extracted records to records of desired fields. By setting the "records extract conditions" and "fields to be extracted" for each master DB, a unique mobile DB is created which meets the contents of the business of the appropriate group and the contents of processing by the respective terminals.

"Customize application 1", "customize application 2", . . . . are set in correspondence to "mobile DB name 1", "mobile DB name 2", . . . , respectively. The "customize application" is an application program for processing the corresponding mobile DB and comprises a changed display form of a basic application 13 corresponding to its master DB changed depending on the mobile DB.

Set in correspondence to each "customize application" are a "software identification number", "update date", and "corresponding mobile DB name". In this case, the "software identification number" is set in common to all the "customize applications" of the same group. The "update date" represents a date where the basic application was changed.

Alternatively, only a customize application name may be set in the setting area of the corresponding "customize application". In this case, the "customize application" itself may be stored in a separate file such that the application software itself may be called in accordance with the corresponding customize application name set on the setting table 11.

A "basic software" is set in an area separate from the set areas of the setting table 11 for the respective groups as data to be written in common to the respective groups. The "basic software" comprises a "retrieval viewer", "FAT scramble/descramble algorithm", "cipher/decipher algorithm", and "operation control/mange file". The "basic software" is used to control the basic operation of each portable terminal. The "retrieval viewer" is used to display an initial or log-in picture in accordance with operation of the basic software application.

The "operation control/manage file" prestores basic control information for controlling operation of the customize application and is usually written on the DB card. In this embodiment, when a wrong password is ineffectively input successively and repeatedly the predetermined number of times, the "operation control/manage file" is deleted to disable the retrieval viewer thereafter. Each portable terminal displays a log-in picture when the retrieval viewer is started up on condition that the file is present in the DB card.

FIG. 5 shows the contents of the data written by the server on each DB card 3; namely, a "hardware identification number", "FAT (scrambled)", "basic software", "retrieval viewer", "FAT scramble/descramble algorithm", "cipher/decipher algorithm", "operation control/manage file", and "viewer disabling input count". The "FAT (scrambled)" is information for managing each mobile DB in the appropriate DB card and written as being scrambled.

A "user name 1", "ciphered password+time variable key"; "user name 2", "ciphered password+time variable key", . . . for the respective users authorized to use the appropriate DB card; and a "record cipher key RK" are written. A "mobile DB name 1", "DB (ciphered)" as its real data; "mobile DB name 2", "DB (ciphered)" as its real data; "customize application 1", "software identification number (common)", "update date", "corresponding mobile DB name"; and "customize application (2)", "software identification number (common)", "update date", and "corresponding mobile DB name" are written for the mobile DB.

FIG. 6 shows data written in a built-in memory of each portable terminal 2. The built-in memory includes a flash ROM and RAM which have a minimum required memory capacity allowing for the security measures. To this end, in the present embodiment the application program, database and basic application program are written on the DB card 3 without being stored separately in the terminals 2 and the DB cards 3 to minimize a risk of leakage of important information due to loss/robbery of the portable terminal itself.

The "hardware identification number", "software identification number", and "scramble key SK" are stored unchangeably in the flash ROM of each terminal by the server 1. The RAM comprises a "key/data input area", "FAT read area", "record area", and "other work areas". The "record area" has a size to temporarily store only a minimum required quantity of data or one record presently under processing to leave no data in the terminal. Although not shown, the internal memory of each terminal 2 has unchangeably stored its unique manufactures' serial number.

Figure 7:
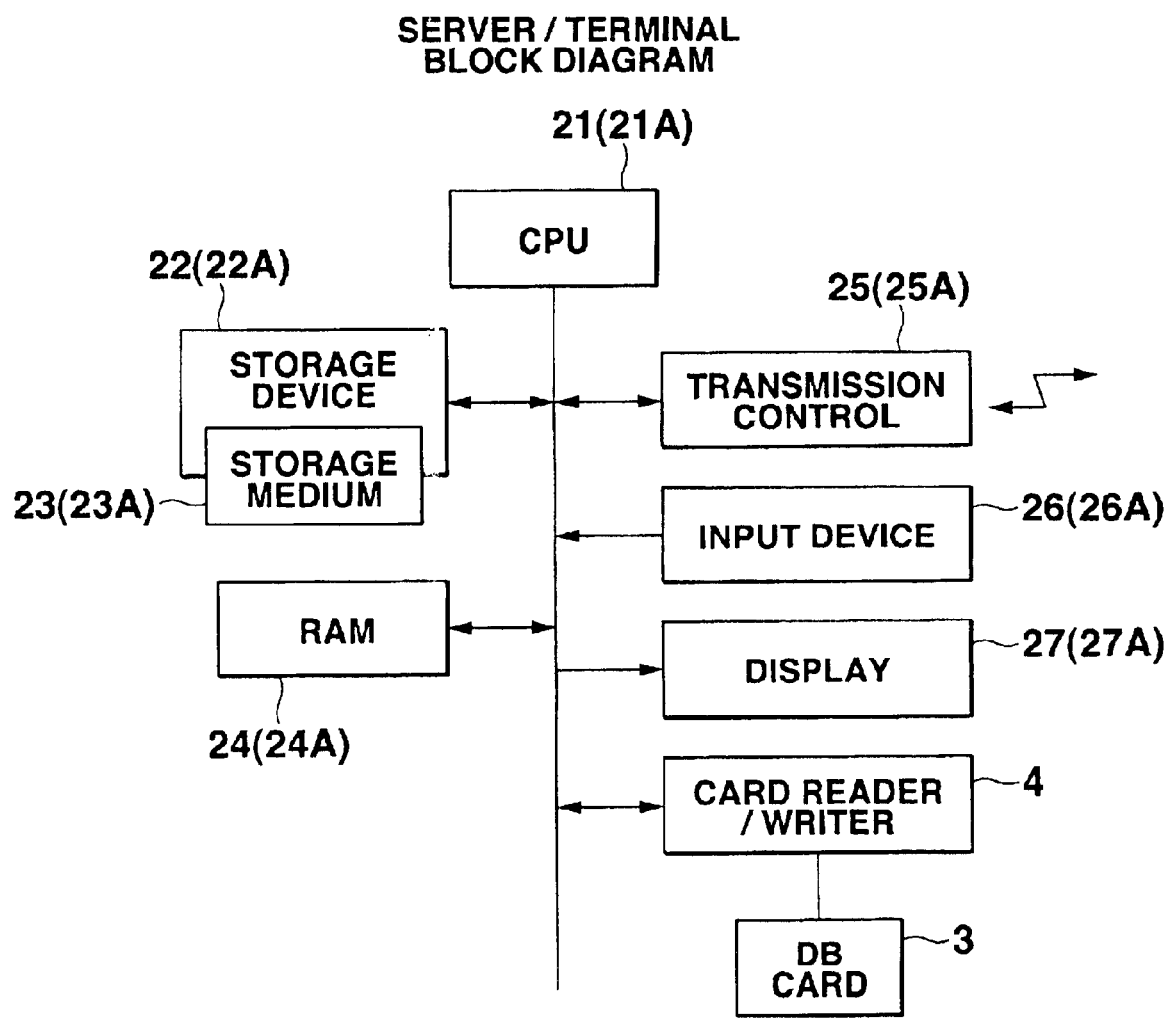
FIG. 7 is a block diagram of each of a server and a portable terminal.

FIG. 7 is a block diagram of each of the server 1 and terminal 2. Basically the same element of the server 1 and terminal 2 is identified by the same reference numeral and explained by the same wording. A character "A" added to a reference numeral represents the corresponding element of the server 1 to be distinguished from that of the terminal 2. Thus, only the composition of each portable terminal 2 will be described next and that of the server 1 omitted. CPU 21 controls a whole operation of the terminal 2 in accordance with an operating system/various application software or programs stored in a recording medium 23 provided in a storage device 22. The medium 23 includes a magnetic, optical or semiconductor memory which also prestores databases and character fonts. The storage device 22 also includes a drive system for driving the storage medium. The recording medium 23 comprises a fixed medium such as a hard disk or a removably settable portable medium such as a CD-ROM, floppy disk, RAM card or magnetic card.

Each of programs and data in the recording medium 23 is loaded as requested by CPU 21 on a RAM (for example, static RAM) 24 and vice versa. The recording medium may be provided in an external device such as the server 1. CPU 21 may directly access programs/data in the recording medium via a transmission medium.

CPU 21 is also capable of receiving programs/data from another device, which composes a part of a computer communications system, via a cable transmission medium such as a communications line/cable or a radio transmission medium such as radio waves, microwaves or infrared rays through a transmission control unit 25 and entering the programs/data in the recording medium 23.

The programs/data may be ones stored and managed by an external device such as the server 1, and CPU 21 may directly access and use the programs/data of the external devices via the transmission medium.

CPU 21 is connected to the transmission control unit 25, an input device 26 and a display 27 as input/output peripheral devices thereof through a bus line and controls their operations in accordance with input/output programs. The input device 26 comprises a keyboard, a touch panel or a pointing device such as a mouse or a touch pen to input character string data/various commands.

Operation of the security managing system of this embodiment will be described next with reference to flowcharts. The programs which realize various functions described in the flowcharts are stored in the recording medium 23 (23A) in the form of readable program codes. CPU 21 (21A) sequentially performs its operation in accordance with the program codes stored in the recording medium or received externally through the transmission medium.

Figure 8A:
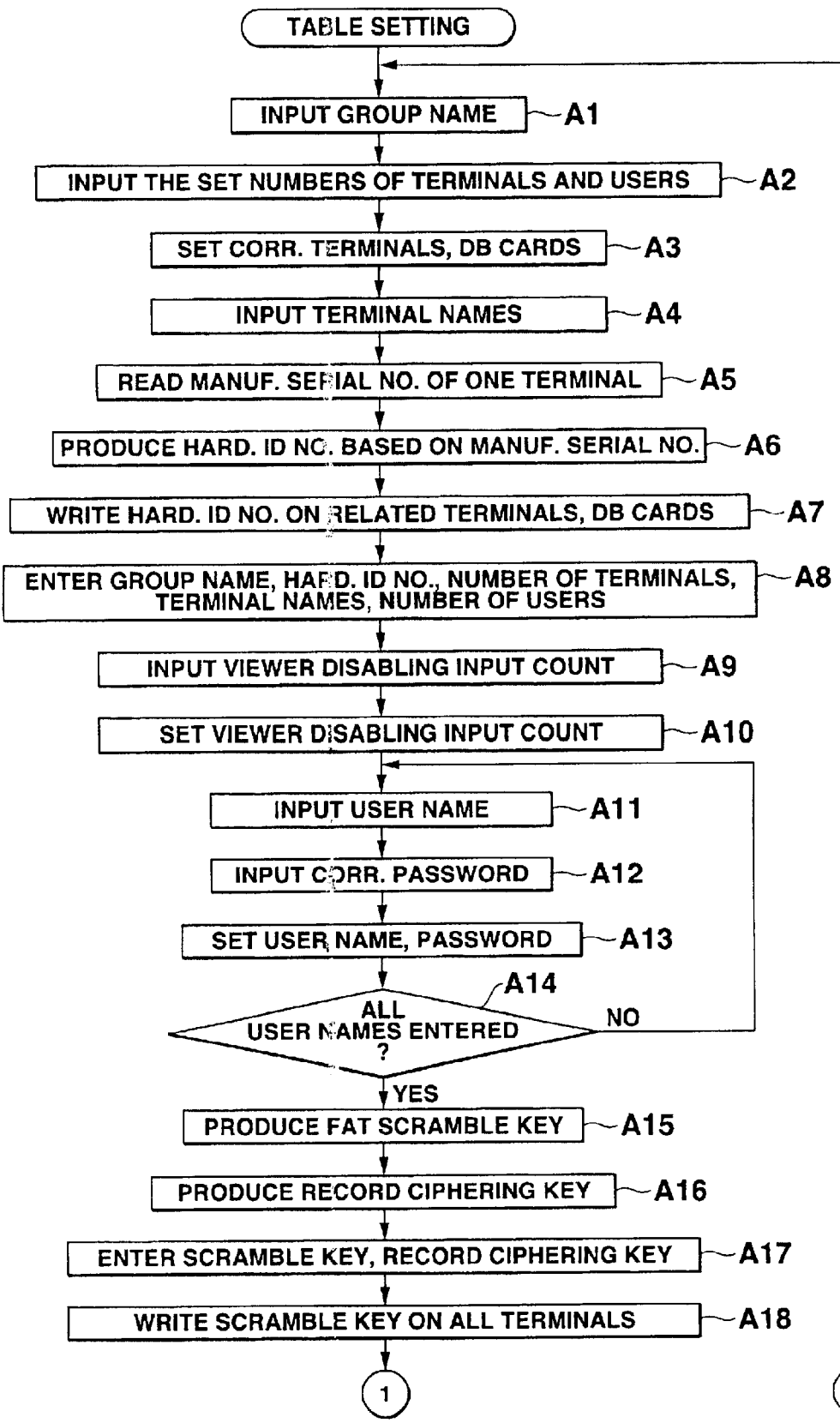
FIGS. 8A and B cooperatively illustrate a table setting process performed by the server on the setting table.
Figure 8B:
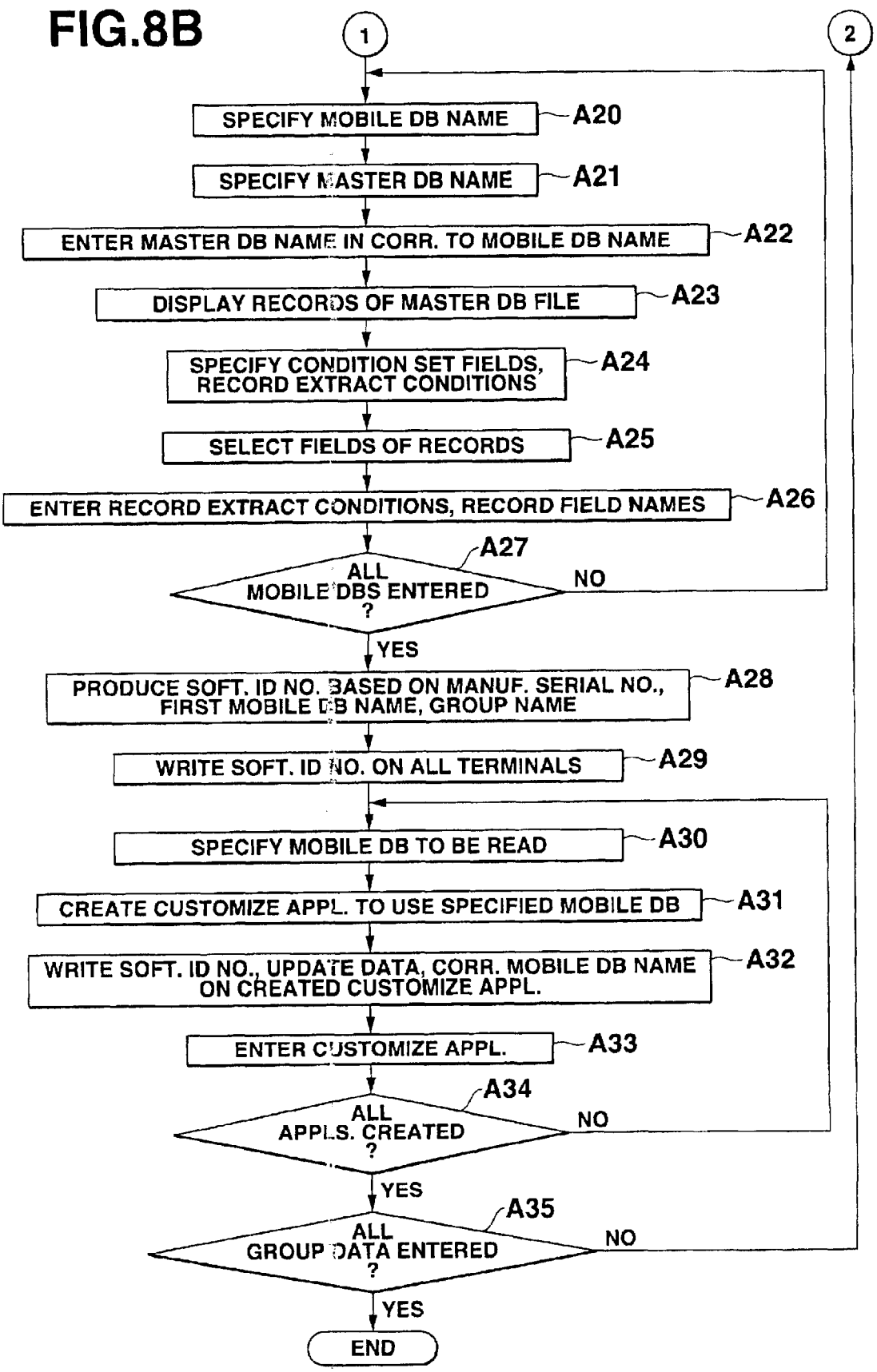

FIGS. 8A and B are flowcharts combined to display various setting operations performed by the server 1 on the setting table 11. First, the server 1 sets basic group information (step A1–A10). The operator inputs a "name of one group" to be set this time in an inputtable state (step A1), and "the respective numbers of terminals and users" of the group (step A2). The operator then sets the terminals 2 and corresponding DB cards 3 for the server 1 (step A3), and then inputs the respective "names" of the set terminals (step A4).

In response, the server 1 selects any particular one of the terminals of the same group set for the server 1, reads its "manufacturer's serial number" (step A5), produces a "hardware identification number" based on the "manufacturer's serial number" (step A6), and then writes the "hardware identification number" on the respective terminals 2 and DB cards 3 (step A7). In the table setting, the writing of the "hardware identification number" on the terminals and DB cards is performed only when the "hardware identification number", a "software identification number" (to be described later), and a "scramble key (SK)" are produced, respectively.

In step A8 the input "group names", "the number of set terminals", "terminal names", "the number of users" and the "hardware identification number" are entered on the setting table 11. When the operator inputs any particular value as the "viewer disabling input count" involving password non-coincidence (step A9), the input "viewer disabling input count" is entered on the setting table 11 (step A10).

When entry of the group basic information is terminated in this way, the control then passes to a process where passwords for the users of the group are entered (steps A11–A15). First, when the operator inputs a user's name (step A11) and a corresponding password (step A12), the input user's name and password are entered on the setting table 11 (step A13). It is then seen whether all the users' names and passwords of the group have been entered (step A14), and if otherwise, iterates the steps A11–A14 until all the relevant users' names and passwords are entered.

The control then passes to a process where the "scramble key SK" and "record ciphering key RK" are entered (step A15–A17). First, the CPU 21 produces the "scramble key SK" (step A15), and "record ciphering key RK" (step A16). As described above, the "scramble key SK" is used when the FA of the mobile DB is scrambled. The "record ciphering key RK" is used when the database is ciphered one record at a time. In this case, those keys may be produced randomly in any manner as requested. The produced "scramble key SK" and "record ciphering key RK" are then entered on the setting table 11 (step A17). The produced "scramble key SK" is then written on the respective portable terminals 2 (step A18).

The control then passes to a process for setting a database and a corresponding application software (steps A20–A34). First, the operator inputs a "mobile DB name" to be written on the DB card and a "master DB name" as the source from which the "mobile DB name" is produced (steps A20, A21). In response, the "mobile DB name" and "master DB name" are entered in corresponding relationship on the setting table 11 (step A22). Then, records of a file in the master DB are displayed for guiding purposes (step A23). In this case, if each of the records of the master DB is composed of data in 8 fields, for example, of A (name), B (address), C (phone number), D (mail address), E (job), F (company name), G (age), H (update date), as shown in FIG. 10A, data in those fields of one record are displayed in that arrangement. The operator confirms the display of the records and then specifies "record extract conditions" (step A24). In more detail, the operator specifies desired ones of the displayed fields of the records as ones on which the conditions are to be set, and then inputs "record extract conditions" for the specified fields. For example, the operator specifies fields for an "update date" item as condition setting fields, and then as "record extract conditions" records updated after Dec. 20, 1999.

The operator then specifies desired ones of the displayed fields of the record as fields to be extracted (step A25). In response, CPU 21A enters the specified "record extract conditions" and the "names" of fields to be extracted are set in correspondence to the mobile DB name concerned on the setting table 11 (step A26).

It is then seen whether all the mobiles DB used in the appropriate group are specified (step A27). If otherwise, the CPU 21A iterates the above steps A20–A27 until all the mobile DB are specified to thereby enter all the mobile DBs. Then, a "software identification number" is produced based on the read "manufacturer's serial number", "mobile DB name" specified first in the group, and the input "group name" (step A28), and the "software identification number" is then written on the set terminals 2 (step A29).

The control then passes to a process in which customize applications are entered in correspondence to the respective mobile DB names entered this time. In more detail, when the operator specifies any particular one of the entered mobile DB names (step A30), a "master DB name" corresponding to the specified mobile DB name is read, a basic applications 13 corresponding to the master DB is accessed, and the basic application 13 is then change to a form to use the mobile DB to thereby create a desired customize application (step A31). For example, a desired customize application is created by specifying a position on the display screen where any specified particular field is indicated in accordance with the composition of records of the mobile DB or by specifying to any desired one the displayed size of the fields to thereby change the basic application.

After writing the "software identification number", "update date" representing the present system date, and corresponding "mobile DB name" on the created, customize application (step A32), the customize application is then entered on the setting table 11 (step A33). The above steps A30–A34 are iterated until all the customize applications are created and entered (step A34).

It is then seen whether all necessary data of FIG. 4 for all the groups have been set and entered (step A35). If otherwise, the steps A1–A35 are iterated for each group until all the data of FIG. 4 are set and entered in correspondence to each group on the setting table 11. In that case, each time the setting and entry of the data for one group is terminated, a next group to be set is specified, and terminals 2 and DB cards 3 of the specified group are set for the server 1. By such table setting, the "hardware identification number", "software identification number", "scramble key SK" are written on the respective terminals 2, and "hardware identification number" and "software identification number" are written on the DB cards 3.

Figure 9A:
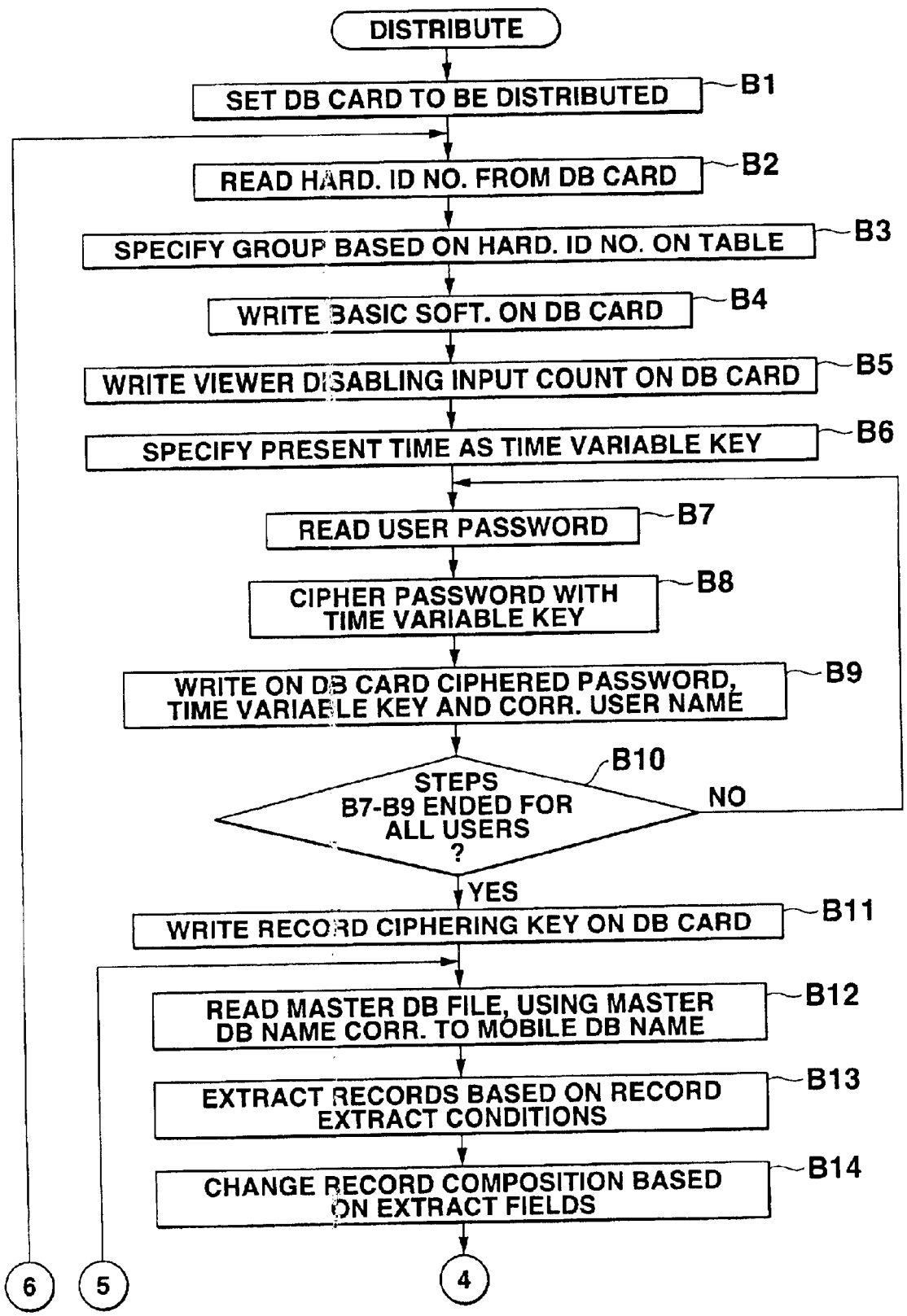
FIGS. 9A and B are flowcharts combined to illustrate a process in which the server writes respective master DBs and customize applications on DB cards and distributes them to corresponding terminals.

FIGS. 9A and B are flowcharts combined to indicate operation of the server 1 which includes writing mobile DBs and corresponding customize applications on DB cards 3 and distributing same to the terminals of the group. First, the operator sets in the server 1 one or more DB cards 3 to be distributed (step B1). In response, one is selected from the sets DB cards and the "hardware identification number" is read out from the card (step B2). The appropriate group is specified from the setting table 11 based on the "hardware identification number" (step B3). The "basic software" common to all the groups is read out from the setting table 11 and written on the DB cards of all groups (step B4). In that case, the basic software prestores the "retrieval viewer", "FAT scramble/descramble algorithm", "cipher/decipher algorithm" and "operation control/manage file".

Then, the "viewer disabling input count N" corresponding to the specified group is read out from the setting table 11 and then written on the DB card (step B5).

The present system date is then gotten and specified as a time variable (step B6). The "password" corresponding to a head one of the users of the specified group is read out from the head user (step B7), and ciphered with the time variable as a key (step B8). A resulting ciphered password and the time variable key are written along with the corresponding user's name on the DB card (step B9).

It is then determined whether all the users of the specified group have been specified (step B10). If otherwise, the steps B7–B10 are iterated for each of the remaining users. Thus, when the processing for all the users has been performed, the "record ciphering key RK" of the specified group is read out from the setting table 11 and written on the DB card (step B11).

Next, a process for creating a mobile DB and writing it on the DB card will be described. First, a master DB file with a master DB name which corresponds to a head one of the mobile DB names for the specified group entered on the setting table 11 is read out (step B12). The "record extract conditions" and "fields to be extracted" corresponding to the master DB name are then gotten, and the master DB file 12 is then searched for the appropriate records based on the "record extract conditions" (step B13). FIG. 10B illustrates a specified example in this case in which records corresponding to the "record extract conditions" are cut away, or extracted, from the master DB (FIG. 10A) to extract only records necessary for the business of the appropriate group and the processing of its terminals.

The composition of the extracted records is then changed based on the "fields to be extracted" (step B14). FIG. 10C illustrates a specified example in this case in which only fields corresponding to the "fields to be extracted" are cut away from the extracted records, and form a new mobile DB.

Figure 9B:
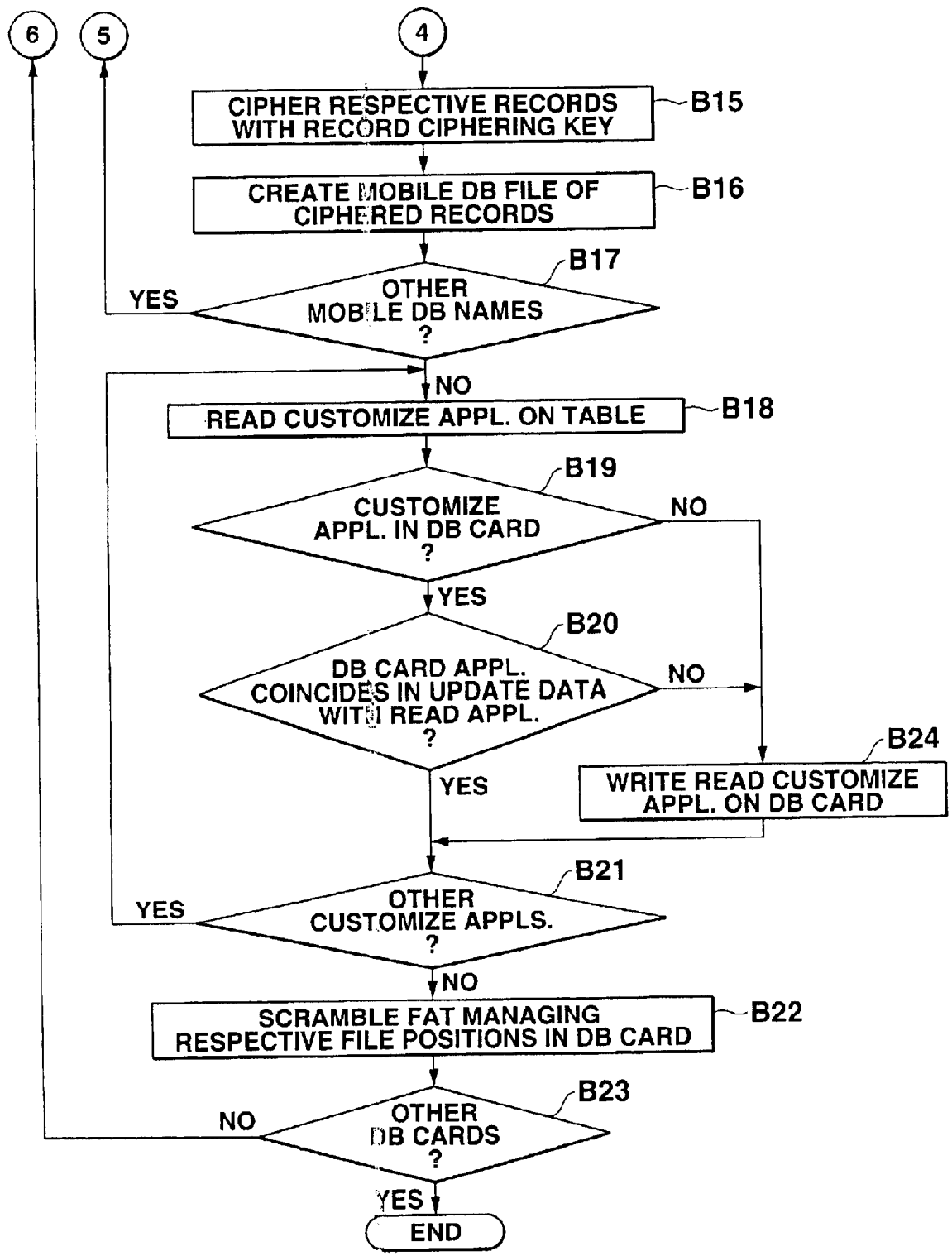

The control then passes to step B15 of FIG. 9B where the respective record fields of the changed record composition are ciphered with the "record ciphering key RK". In this case, each time each record field is ciphered, the value of the record ciphering key RK is updated such that the respective record fields are ciphered individually with different ciphering keys. A mobile DB file of the ciphered records is then produced and written on the DB card (step B16).

It is then seen whether another mobile DB name is entered in correspondence to the specified group (step B17). If it is, the control returns to step B12 where the above steps B1–B12 are iterated. Thus, the mobile DB file is created for each of the mobile DB names of the specified group and written on the DB card. A FAT indicative of positions where the files are stored is created and written on the DB card.

The control then passes to a process where a customize application corresponding to the mobile DB is written on the DB card. First, a customize application corresponding to a master DB name is read out from the setting table 11 based on the master DB name (step B18). It is then seen whether the customize application is present in the DB card (step B19). Since it is not present at first, the control passes to step B24 where the present customize application on the setting table 11 is read and written on the DB card. Thus, the newest customize application (including its software identification number and update date) is newly written on the DB card in correspondence to the mobile DB.

When the customize application is present in the DB card (step B19), it is determined whether the update date in the DB card coincides with that of the present customize application (step B20). When it is determined that both the dates are not coincident, or when the present customize application is updated, the control passes to step B24 where the present customize application is written on the DB card to provide the newest customize application. When the DB card and the present customize application coincide in update date, the customize application in the DB card is the newest one. Thus, no update is performed.

It is then seen whether another customize application is set in the same group (step B21). If it is, the control returns to step B18 where a next customize application is read and steps B18–B21 are iterated.

When the customize application has been written, a FAT indicative of positions where the respective files of the mobile DBs in the DB card are stored is scrambled with the scramble key SK (step B22). Then, it is seen whether there are other unwritten DB cards (step B23). If there are, the control returns to step B2 of FIG. 9A where one of the unwritten DB cards is specified and the above process is iterated on that card. Thus, the data of FIG. 6 are written on the respective DB cards set in the server 1. The DB cards on which the basic software, user information, mobile DB and corresponding customize application are written are distributed to the respective users of the group concerned.

Figure 11:
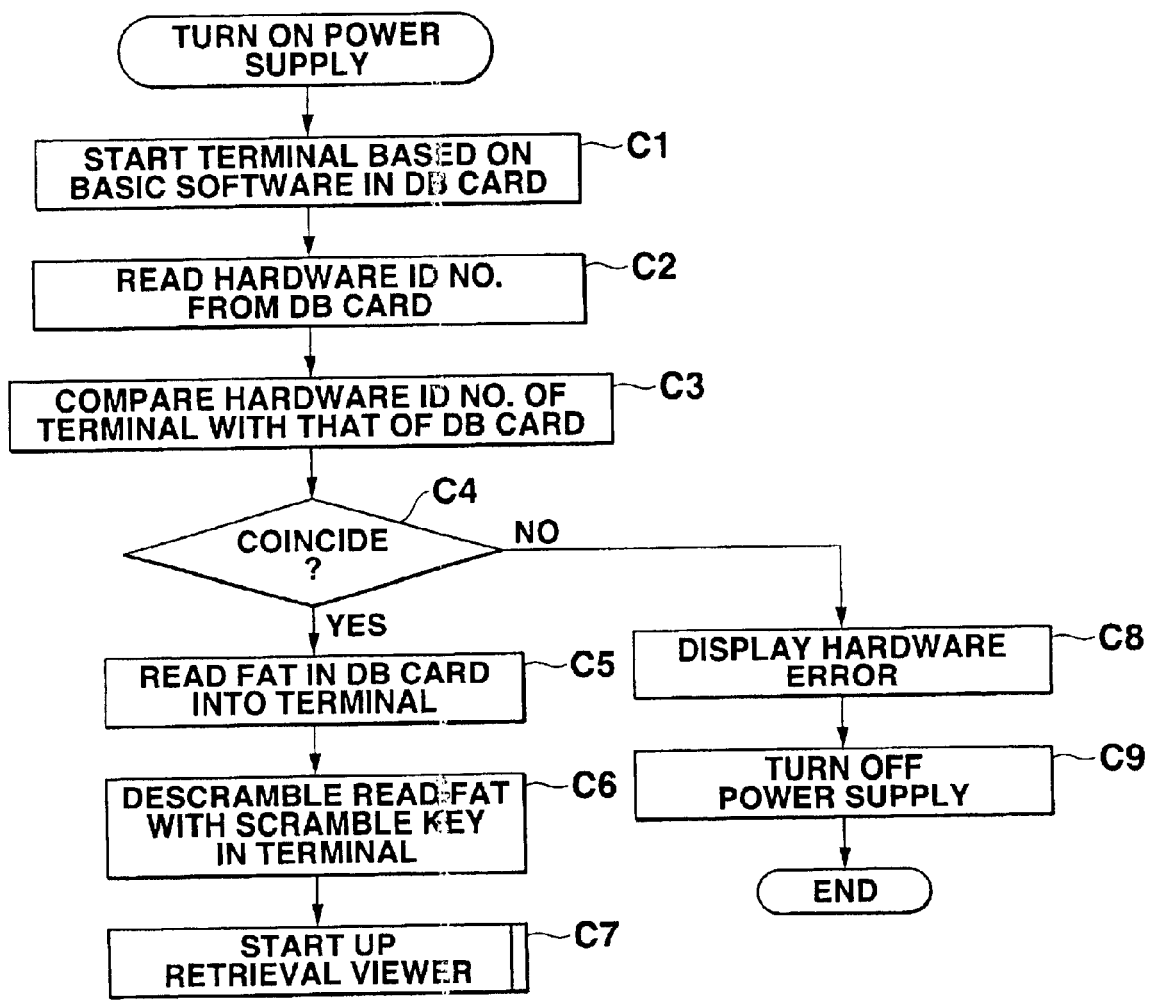

FIG. 11 is a flowchart of operation of the portable terminal started up when its power supply is turn on. First, when the power supply is turned on in a state where a DB card is set in the terminal, its basic operation is started based on the basic software in the DB card (step C1). In response, the DB card security process is performed by the first security layer. In this case, the hardware identification number is read from the DB card (step C2) and checked against the hardware identification number of the terminal (step C3). As a results, when both coincide (step C4), the terminal is in a rightful corresponding relationship to the card. Thus, the scrambled FAT in the DB card is read into the terminal, and set in the "FAT read area" of the RAM of FIG. 6 (step C5). The scrambled FAT is then descrambled with the scramble key SK in the terminal (step C6). The retrieval viewer is then started up (step C7). If the terminal is not in a rightful corresponding relationship to the card, they are determined to be not coincident in hardware identification number. Thus, a hardware error is displayed (step C8), the power supply is forcedly turned off (step C9), and the process ends.

Figure 12:
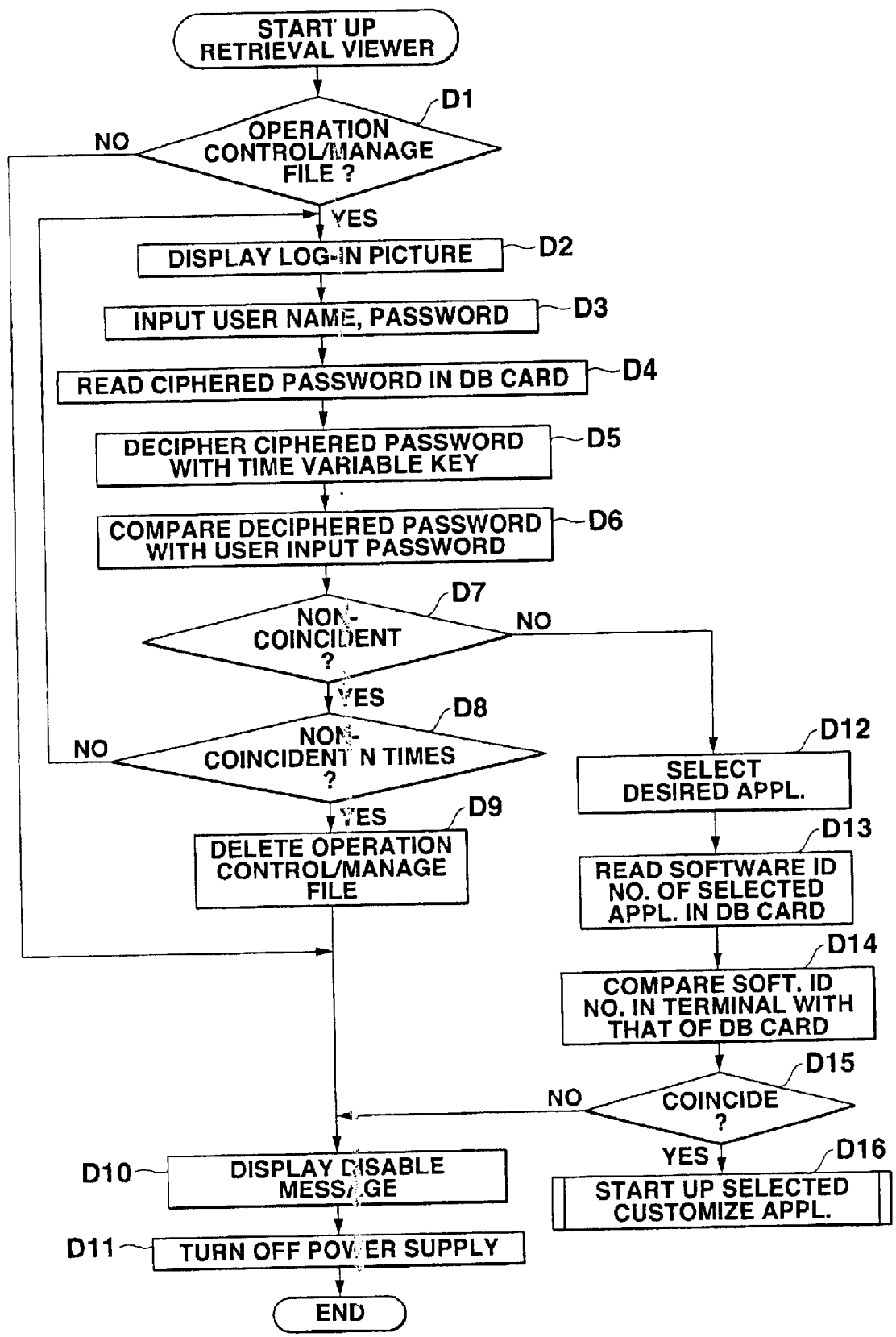
FIG. 12 is a flowchart of a detailed operation of a step c7 of FIG. 11 performed when a retrieval viewer starts.

FIG. 12 is a flowchart indicative of the details of step C7 of FIG. 11 started on start-up of the retrieval viewer. First, a security process is executed in the password authentication process performed by the second security layer. In this case, the terminal accesses the DB card when the retrieval viewer is started up, and checks to see whether there is the operation control/manage file in the card (step D1). When a wrong password is ineffectively input successively and repeatedly a predetermined number of times, the operation control/manage file is deleted in order to disable the retrieval viewer thereafter. Thus, if the terminal determines that there is not the operation control/manage file, a terminal disable message is displayed (step D10), the power supply is forcedly turned off accordingly (step D11), and the process ends.

If there is the operation control/manage file, a log-in picture is displayed which urges the user to input a user's name and his or her password (step D2). When the user inputs his or her user's name and password (step D3), a ciphered password corresponding to the user's name in the DB card is read out (step D4), and deciphered with a time variable as a key (step D5). The input password is then checked against the deciphered password (step D6). As a result, when it is determined that both the passwords are not coincident (step D7), the number of times of being non-coincident is incremented, the incremented number of times of being non-coincident is compared with the viewer disabling input count N set in the group to check to see whether the wrong password is input successively N times (step D8). If otherwise, the control returns to the log-in picture (step D2) to again receive the user's name and password input by the user.

When it is determined that the wrong password was ineffectively input successively N times in a repeating manner (step D8), the operation control/manage file is deleted from the DB card (step D9), an operation disable message is displayed (step D10), the power supply is forcedly turned off (step D11), and the process ends. When it is determined that both the passwords coincide before the password is input successively N times repeatedly and that the user is a rightful one (step D7), the software security process is performed by the third security layer. More specifically, a menu picture of the respective customize applications written in the DB card is displayed. Thus, when the user selects a desired customize application in the menu picture (step D12), the software identification number contained in the selected customize application is read out from the DB card (step D13) and compared with the software identification number of the user's terminal (step D14). When it is determined as a result that both the software identification numbers are not coincident (step D15), an operation disable message is displayed (step D10), the power supply is forcedly turned off (step D11), and the process ends. When it is determined as a result of the comparison that both the software identification numbers are coincident, the selected customize application appears on the display screen and a corresponding application process is started (step D16).

Figure 13A:
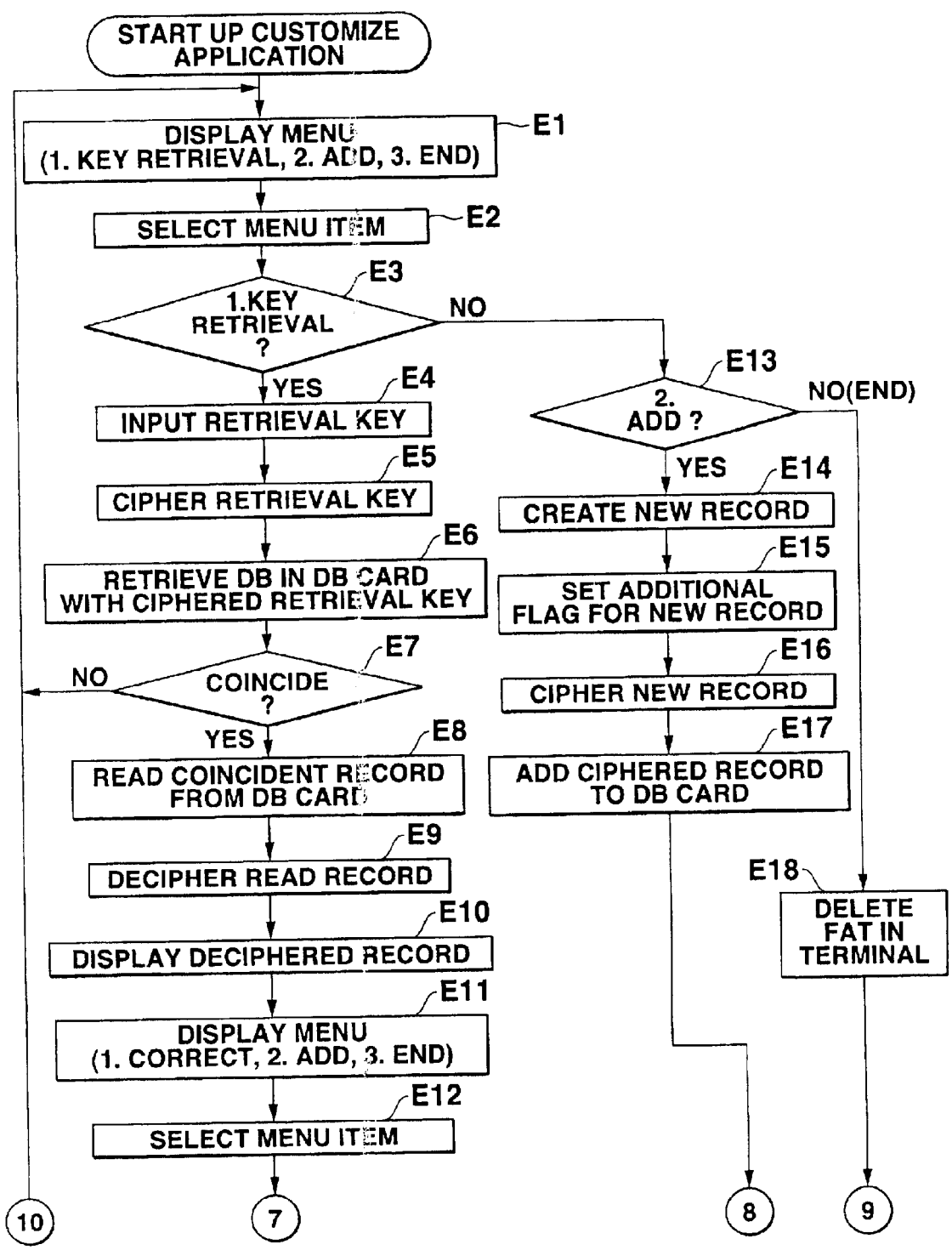
FIGS. 13A and B cooperatively illustrate a step D16 performed when a customize application corresponding to a DB is started.
Figure 13B:
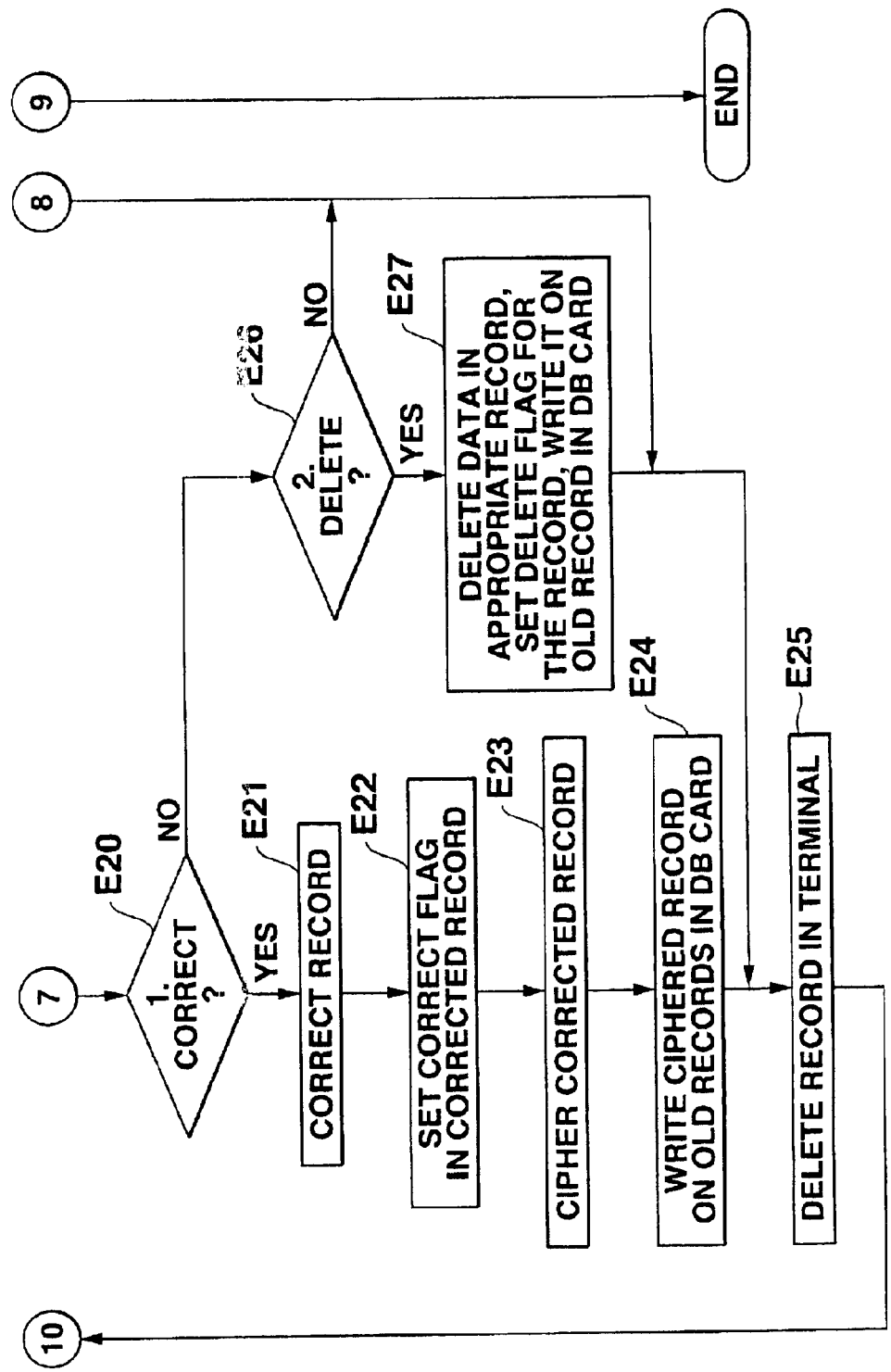

FIGS. 13A and B are flowcharts combined to indicate the details of step D16 of FIG. 12 performed when the customize application starts. First, a processing menu is displayed (step E1). In this case, the menu picture displays items "key retrieval", "addition" and "end". When a desired menu item is selected (step E2) the selected item is checked (steps E3, E13) and a corresponding process starts. When the menu item "key retrieval" is selected and a retrieval key (for example, a commodity's name or-a customer's name) is input (step E4), the "record ciphering key RK" is read from the DB card and the retrieval key is ciphered with the record ciphering key RK (step E5). A mobile DB in the DB card is then searched for a key matching the ciphered retrieval key (step E6). If there is no matching key (step E7), the menu display picture again appears (step E1) and the retrieval key is inputtable again. When there is the matching key as a result of its search (step E7), the control passes; to step E8 where a record corresponding to the retrieval key is read from the appropriate mobile DB and written in a "record area" of the FIG. 6 RAM. This record is then deciphered with the record ciphering key RK (step E9), the contents of the record are displayed (step E10) and the processing menu is displayed (step E11). In this case, the menu picture displays items "correct", "delete", and "end". Thus, a desired menu item is selected in the picture (step E12), which causes the selected item to be checked (steps E20, E26 of FIG. 16) and the corresponding process starts.

When the item "correct" is selected (step E20) and correct data is input, the record is corrected accordingly (step E21). A "correct flag" is then set in the corrected record to indicate that the record is corrected (step E22), the corrected record is ciphered with the record ciphering key RK (step E23), and the ciphered record is written on the original record in the appropriate DB (step E24). Then, the record is deleted from the terminal (step E25), or the record area in the RAM of FIG. 6 is cleared.

When the menu item "delete" is selected (step E26), data of the record is deleted, a "delete flag" is set in the record, and the data-free record with the delete flag is written over the original record of the mobile DB (step E27). The record is then deleted from the terminal (step E25).

When the item "add" is selected in the processing menu picture in step E1 of FIG. 13A (step E13), the control passes to step E14 where a new record is input and created. In order to indicate the addition of the record, an "add flag" is set in the new record (step E15), the new record is ciphered with the record ciphering key RK (step E16), and the ciphered record is added to the mobile DB (step E17). Then, the record is deleted from the terminal (step E25).

When the "end" is selected in the processing menu picture in step E1, the "FAT" in the terminal is deleted (step E18), or the contents of the "FAT read area" in the FIG. 6 RAM are cleared, and then the record in the terminal is deleted (step E25). In this way, in the terminal the contents of the file of the mobile DB stored in the DB card are updated as the daily business is performed.

Figure 14:
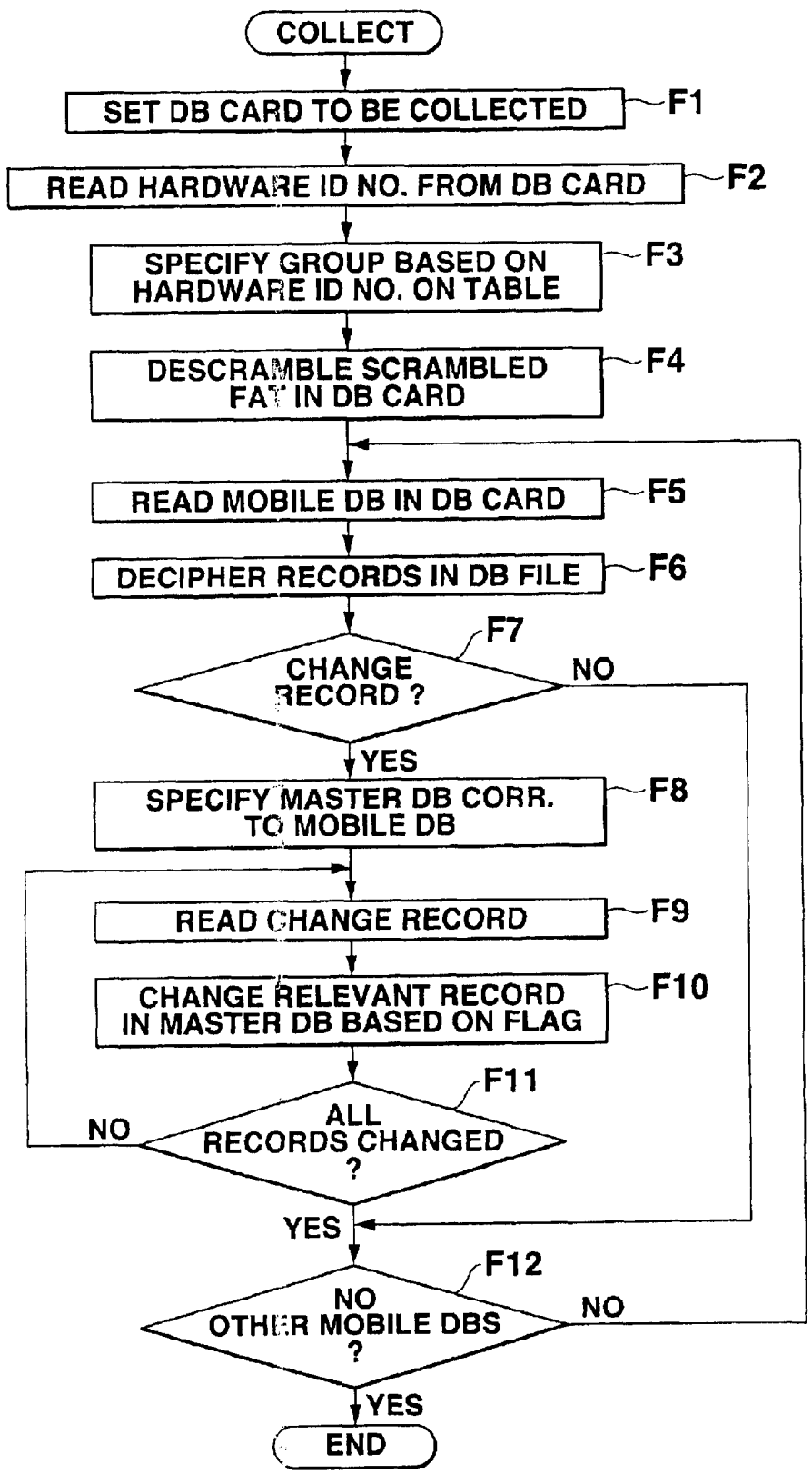
FIG. 14 is a flowchart of collection of mobile DBs of DB cards changed in accordance with transaction of daily business by the server and update of master DBs in the server.

FIG. 14 is a flowchart of collection of mobile DBs in a card changed as the daily business is performed and update of the master DBs in the server, performed by the server. When the operator sets in the server 1 a DB card to be collected (step F1), a "hardware identification number" is read from the DB card (step F2), and the relevant group is specified by referring to the setting table 11 based on the hardware identification number (step F3). The scramble key SK is then read from the DB card, and the FAT of the DB card is descrambled with the scramble key SK (step F4).

A mobile DB is read from the DB card (step F5), and each record flag of the DB file is then deciphered with the record ciphering key RK (step F6). Also in this case, each time each record field is deciphered, the value of the record ciphering key RK is updated and a next record file is deciphered with the updated key.

It is then seen based on the presence/absence of the "correct flag", "delete flag" and "add flag" whether there is any record to be changed in the deciphered DB file (step F7). If there is, or if a record to which any of the flags is added is present, a master DB in the server corresponding to the mobile DB is specified (step F8) and the appropriate record in the master DB is updated with the change record read from the mobile DB in accordance with a type of the "flag" added to the changed record (steps F9, F10). That is, a step for correcting the contents of the appropriate record, a step for deleting data of the record and a step for adding a new record are performed. The step for updating the record of the master DB is performed on all the changed records in the mobile DB (steps F9–F11). If there is another mobile DB in the DB card (step F12), the steps F5–F12 are performed on the mobile DB.

As described above, when the terminal accesses a DB card in the present embodiment, it compares the "hardware identification number" of the card with that of the terminal, and determines based on the result of the comparison whether the terminal is authorized to access the DB card. When it is determined as the result of the determination that the terminal is authenticated to access to the card, the terminal compares the "software identification number" stored in the card with that of the terminal, to determine whether the terminal is authorized to access the mobile DB of the card. Thus, when it is determined by seeing whether the terminal and the medium are in rightful corresponding relationship that the terminal is not an authorized or rightful one, all possible multi-security measures are taken which disable access to the mobile DB as well as to the card.

Thus, data in the mobile DB of the DB card is completely prevented from leaking out to the third party due to pickup, and robbery of the DB card and/or its malice. Security management is achieved which impairs no operability of the terminal without requiring any special manipulation for security management. That is, only by setting the DB card in the portable terminal, the security management is performed automatically. Thus, when the user uses the DB card, the user is not required to be conscious of taking security measures, and is able to achieve the security management reliably without impairing handiness of the terminal and DB card.

In this case, the mobile DB which contains important information is kept only in the DB card separable from the terminal. Thus, even if the user loses only the terminal or has only the terminal stolen, there arises no security problem. Even when the DB card is picked up or stolen by a third party, the card has a mechanism by which only a rightful terminal is allowed to access the card. Thus, the unauthorized person cannot access the mobile DB as well as the DB card itself, which provides very high security.

As described above, when the terminal accesses any DB card, it compares its "hardware identification number" with that of the card, and checks based on a result of the comparison to see whether the terminal is a rightful one authorized to access the card. If the terminal is the rightful one, the terminal accepts inputting of the user's password, compares the input password with that of the card. The terminal then checks on the result of the comparison to see whether the user is a rightful one. If the user is the rightful one, the terminal compares the "software identification number" of the DB card with that thereof and checks based on the result of the comparison to see whether the terminal is a rightful one authorized to access the mobile DB in the card. Thus, all possible security measures are taken which include checking in a multiple manner to see whether when the card is picked up or stolen and used by the third party, the accessing terminal and its user are each a rightful one authorized to acess the card. More specifically, even if the first security layer using the "hardware identification numbers" is broken through, the second security layer provides security using password comparison. Furthermore, even if the second security layer is broken through, the third security layer protects security, using the "software identification numbers". Thus, the third party other than the rightful terminal or user is reliably prevented from performing illegal access to the DB card and hence reliable security management is achieved, considering rightful use of the DB card at the client's/customer's office/company or at a place distant from a company for which the rightful user works.

In this case, when a wrong password is ineffectively input successively and repeatedly a predetermined number of times, the "operation control/manage file" is deleted from the DB card. Thus, the retrieval viewer is disabled thereafter and access to the card itself is physically impossible, as in the first security layer using the "hardware identification number" to thereby reliably prevent invasion of the third party into the third security layer.

When the server 1 writes mobile DBs on the DB card, the server 1 successively places the DB card and the portable terminals authorized to access the DB card, and the DB card and the users authorized to use the DB card, in corresponding relationship. Thus, this work is performed efficiently and security management of the DB card is ensured. Thus, the portable terminals themselves have no mechanisms for taking such measures, the users are not required to perform special operations for security management, and reliable security management which impairs no operability of the terminal is achieved.

The server, which writes a mobile DB used by the portable terminals on a corresponding DB card, ciphers respective records in a DB file to be written, scrambles a FAT of the ciphered DB file descramblably, and writes the scrambled mobile DB on the DB card. Thus, the mobile DB is effectively multi-ciphered. Thus, even if a terminal other than a rightful one reaches access to the mobile DB in a worst case, even a part of the mobile DB will not be deciphered, much less the whole mobile DB to thereby reliably prevent leakage of important information stored in the mobile DB.

Any information may be used to produce the hardware and software identification numbers. For example, the hardware identification number may include the manufacturing company code+a manufacturer's serial number of the portable terminal. When a plurality of mobile DBs are stored in the same DB card, the software identification number may vary from mobile DB to mobile DB.

It is possible to set each of the terminal so as to belong to a plurality of groups without dividing the terminals solely into a plurality of groups.

While in the embodiment it is illustrated in creating a mobile DB file that the value of the record ciphering key RK is updated and a record file is ciphered with the updated value of the key, a plurality of different record ciphering keys RK may be prepared for and used to cipher a corresponding plurality of records, respectively. Alternatively, the plurality of record ciphering keys RK may be stored in and managed by the respective portable terminals.

While in the embodiment the FAT is illustrated as being scrambled in the mobile DB file, the mobile DB file itself may be scrambled. Of course, the password is not necessarily required to be ciphered with a time variable as a key.

While in the embodiment a compact flash card is illustrated as a DB card which comprises a portable storage medium, the DB card may be a PC card, smart medium, OD (optical disk), MO (opto-magnetic disk) or FD (floppy disk). While the DB card is illustrated as taking the form of a card, it may take any form such as that of a cassette or stick. The portable terminals may be electronic notebooks, notebook-sized personal computers, PDAs or portable telephones.

What is claimed is:

1. A system comprising:

a portable data storage medium; and a portable terminal to which the data storage medium is connectable;

wherein the portable data storage medium has stored thereon a plurality of software applications operable on the portable terminal, a data file created by each of the software applications, a hardware identification code for identifying the data storage medium, a plurality of software identification codes for the plurality of software applications, respectively, and a plurality of user passwords for specifying a plurality of users, respectively, that are able to use the data storage medium, wherein the portable terminal comprises a non-rewritable storage area in which a hardware identification code for specifying the portable terminal and a plurality of software identification codes each for identifying available software applications are stored, and a rewritable storage area; and wherein the portable terminal further comprises:

means, responsive to a power supply being turned on when the portable data storage medium has been connected to the portable terminal, for reading the hardware identification code stored on the data storage medium and then determining whether or not the read hardware identification code matches the hardware identification code stored in the non-rewritable storage area of the portable terminal;

means, responsive to determining that the read identification code matches, for determining whether or not a password inputted by a user who operates the portable terminal matches any one of the plurality of passwords for specifying the plurality of users, respectively, stored in the data storage medium;

means, responsive to determining that the inputted password matches, for allowing the user to select any desired one of the plurality of software applications stored on the data storage medium;

means, responsive to the user selecting the desired application software, for reading from the data storage medium a software identification code corresponding to the selected software application, and for determining whether or not the software identification code matching the read software identification code is stored in the non-rewritable storage area of the portable terminal; and means, responsive to determining that the matching software identification code is stored, for starting up the selected software application stored on the data storage medium, and for storing on the data storage medium a data file created by operation of that application software as a data file corresponding to that application software.

2. The system according to claim 1, wherein:

the portable data storage medium further stores basic software for driving the portable terminal; and the portable terminal is responsive to the power source being turned on to thereby be operated by the basic software for reading the hardware identification information from the data storage medium, and for determining whether or not the read hardware identification information matches the hardware identification information stored on the portable terminal.

3. A system comprising:

a portable storage medium;

a portable terminal to which the portable storage medium is connectable; and a server that writes various codes and software to the data storage medium and the portable terminal;

wherein the server comprises:

means for storing hardware identification code unchangeably on the portable terminal and the portable data storage medium in order to set the portable terminal and the portable data storage medium in corresponding relationship;

means for storing on the portable terminal unchangeably a software identification code corresponding to a software application to be operated on the portable terminal; and means for storing on the portable data storage medium a plurality of software applications operating on the portable terminal, a plurality of data files created by the plurality of software applications, respectively, a plurality of software identification codes for the plurality of software applications, respectively, and a plurality of user passwords for specifying a plurality of users, respectively, who are able to use the data storage medium.

4. A method comprising:

storing on a portable data storage medium: (i) a plurality of software applications operable on a portable terminal to which the data storage medium is connectable, (ii) a data file created by each of the software applications, (iii) a hardware identification code for identifying the data storage medium, (iv) a plurality of software identification codes for the plurality of software applications, respectively, and (v) a plurality of user passwords for specifying a plurality of users, respectively, that are able to use the data storage medium;

storing in the portable terminal a hardware identification code for specifying the portable terminal and a plurality of software identification codes each for identifying available software applications; and reading the hardware identification code stored on the data storage medium and then determining whether the read hardware identification code matches the hardware identification code stored in the portable terminal, in response to a power supply being turned on when the portable data storage medium has been connected to the portable terminal;

determining whether a password inputted by a user who operates the portable terminal matches any one of the plurality of passwords for specifying the plurality of users, respectively, stored in the data storage medium, in response to a determination that the read identification code matches;

allowing the user to select any desired one of the plurality of software applications stored on the data storage medium, in response to a determination that the inputted password matches;

reading from the data storage medium a software identification code corresponding to the selected software application, and determining whether the software identification code matching the read software identification code is stored in the portable terminal, in response to the user selecting the desired application software; and starting up the selected software application stored on the data storage medium, and storing on the data storage medium a data file created by operation of that application software as a data file corresponding to that application software, in response to a determination that the matching software identification code is stored.

* * * * *